(12) United States Patent
Hunter

(10) Patent No.: US 6,424,998 B2
(45) Date of Patent: *Jul. 23, 2002

(54) SYSTEM PERMITTING THE DISPLAY OF VIDEO OR STILL IMAGE CONTENT ON SELECTED DISPLAYS OF AN ELECTRONIC DISPLAY NETWORK ACCORDING TO CUSTOMER DICTATES

(75) Inventor: Charles Eric Hunter, Hilton Head Island, SC (US)

(73) Assignee: World Theatre, Inc., Morrisville, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,111
(22) Filed: May 18, 1999

Related U.S. Application Data (63) Continuation-in-part of application No. 09/301,102, filed on Apr. 28, 1999.

(51) Int. Cl.$^7$ .............................................. G06F 15/167
(52) U.S. Cl. ........................ 709/207; 709/217; 709/218; 709/227; 705/26; 705/27
(58) Field of Search ................................ 709/207, 217, 709/218, 219, 227, 234, 238, 240; 705/26, 27

(56) References Cited

U.S. PATENT DOCUMENTS

| | | |
|---|---|---|
| 3,373,517 A | 3/1968 | Halperin |
| 3,376,465 A | 4/1968 | Corpew |
| 3,941,926 A | 3/1976 | Slobodzian et al. |
| 4,368,485 A | 1/1983 | Midland |
| 4,559,480 A | 12/1985 | Nobs |
| 4,734,779 A | 3/1988 | Levis et al. |
| 4,761,641 A | 8/1988 | Schreiber |
| 4,812,843 A | 3/1989 | Champion, III et al. |
| 5,214,793 A | 5/1993 | Conway et al. |
| 5,233,423 A | 8/1993 | Jernigan et al. |
| 5,257,017 A | 10/1993 | Jones et al. |
| 5,274,762 A | 12/1993 | Paterson et al. |
| 5,469,020 A | 11/1995 | Herrick |
| 5,486,819 A | 1/1996 | Horie |
| 5,543,856 A | 8/1996 | Rosser et al. |
| 5,612,741 A | 3/1997 | Loban et al. |
| 5,630,067 A | 5/1997 | Kindell et al. |
| 5,644,859 A | 7/1997 | Hsu |
| 5,724,062 A | 3/1998 | Hunter |
| 5,781,734 A | 7/1998 | Ohno et al. |
| 5,845,083 A | 12/1998 | Hamadani et al. |
| 5,848,129 A | 12/1998 | Baker |
| 5,898,384 A * | 4/1999 | Alt et al. ................ 340/825.36 |
| 5,934,795 A * | 8/1999 | Rykowski et al. .......... 362/309 |
| 5,992,888 A * | 11/1999 | North et al. ................... 283/56 |
| 6,073,372 A * | 6/2000 | Davis ...................... 40/124.16 |

OTHER PUBLICATIONS

Steven A. Morley, "Making Digital Cinema Actually Happen —What It Takes and Who's Going to Do It", *Qualcomm Incorporated*, Oct. 31, 1998.

* cited by examiner

Primary Examiner—Thomas R. Peeso
(74) Attorney, Agent, or Firm—Finnegan, Henderson, Farabow, Garrett & Dunner, LLP (57) ABSTRACT

Commercial advertisers, such as consumer product companies and the advertising agents that represent them, directly access a network of thousands of large, high resolution electronic displays located in high traffic areas and directly send their own advertisements electronically to the network to be displayed at locations and times selected by the advertisers. In another application, operators of digital movie theaters have ongoing, continuous access to tens of thousands of movies that can be ordered in digital form for display on selected screens at their theaters at selected times.

22 Claims, 4 Drawing Sheets

SYSTEM PERMITTING THE DISPLAY OF VIDEO OR STILL IMAGE CONTENT ON SELECTED DISPLAYS OF AN ELECTRONIC DISPLAY NETWORK ACCORDING TO CUSTOMER DICTATES

CROSS REFERENCE TO RELATED APPLICATION

This application is a continuation in part of Ser. No. 09/301,102, filed Apr. 28, 1999 pending.

FIELD OF THE INVENTION

The invention relates to the display of video or still image content on electronic displays. More particularly, the invention relates to a network of thousands of electronic displays, such as electronic billboards or electronic digital movie displays, and a related system that permits display of content on selected displays according to customer dictates.

BACKGROUND OF THE INVENTION

Background, Advertising/Billboards

Consumer product advertising takes many forms, such as television commercials, newspaper and magazine advertisements, mailings, point-of-sale displays, outdoor billboards, etc. Using current advertising media, advertisers engage in a constant struggle to efficiently use their budgets to most effectively reach their geographic and demographic targets.

Focusing on the outdoor advertising component of advertising by consumer product companies, it is well known that outdoor billboards have traditionally taken the form of single-message displays formed of printed sheets or painted surfaces containing the advertising content adhered to a flat backing. This time-honored outdoor advertising technique has remained essentially unchanged throughout the twentieth century. The high cost of printing, transporting and mounting a message on a conventional billboard has dictated that the same message remain in place for a considerable period of time. Thus, a conventional billboard cannot be readily changed to reflect current events within the geographic area of the billboard. Additionally, the content on a conventional billboard tends to become essentially "invisible" as a part of the landscape after its content has been in place for a relatively short period of time, especially to commuters and others who regularly pass the billboard. Beyond the above problems with cost, single-message content, lack of content changeover capability, and the like, conventional outdoor billboards have come under increasing criticism because in their large numbers, and often tattered condition, they clutter highways with a distasteful form of visual "pollution". A reduction in the number of billboards and improvement of the appearance of those that remain, if accomplished while increasing the overall advertising impact afforded by outdoor advertising, would please virtually everyone.

The use of electronic billboards has been suggested, for example, in U.S. Pat. No. 5,612,741. However, there is no electronic billboard network in operation whereby commercial advertisers may directly place ads onto selected billboards at selected times through direct access to a master network. Such a network, properly designed and operated, promises to overcome the numerous disadvantages currently associated with the outdoor advertising industry, while also meeting the above needs of consumer products advertisers.

Background, Distribution and Display of Movies at Movie Theaters

For virtually the entire twentieth century the practice of distributing movies on film reels to movie theaters has gone fundamentally unchanged. As is well known, movie content is stored on large reels of film, one or more copies of which must be physically transported to each movie theater where the movie will be shown. The films are bulky, heavy, and expensive to reproduce and ship to movie theaters. Films also show wear and eventually must be removed from use. Obviously, a movie theater's ability to show a particular movie is subject to the film reels being physically present at the proper time. Thus, substantial lead time must be provided anytime a movie theater operator is preparing the schedule for his screen(s).

In addition to the above problems inherent in the current movie distribution scheme, the high cost of conventional film reel movie distribution results in most movies not going to full distribution. In this regard, the full distribution of a movie (the cost of film reels, transportation, etc.) can run up to four to five million dollars or more. As a related problem, the cost of making film reels of older movies, particularly non-"blockbuster" movies, available on an ongoing basis is prohibitive. Thus, theater owners and movie goers are deprived of movie theater screening for the vast majority of available movie content because the movies are not in current distribution. Importantly, as well, content providers (e.g., Disney, Warner Brothers, etc.) are deprived of the revenue from the movies for which ongoing, continuous distribution is simply too expensive.

There is an acute need for a new movie distribution system for the twenty first century that will overcome the above shortcomings of current movie distribution practices.

SUMMARY OF THE INVENTION

The present invention, in one broad respect, is a system that permits video (e.g., movies) or still image content to be displayed on selected ones of multiple, networked electronic displays at selected times according to dictates of the customers of the system.

According to one implementation of the invention, commercial advertisers, such as consumer product companies and the advertising agents that represent them, directly access a network of multiple, large, high resolution electronic displays located in high traffic areas and directly send their own advertisements electronically to the network to be displayed at locations and times selected by the advertisers. In preferred embodiments, this implementation of the invention includes a central information processing center that permits customers to review a schedule of times and electronic display locations that are available for placement of advertisements, and also permits customers to purchase available times at selected electronic display locations for placement of their advertising content. The customer then transmits his video or still image advertising content to the processing center where the content is reviewed for appropriateness and then transmitted to the customer-selected electronic display(s). The electronic displays preferably are large (e.g., 23x33½ ft.) flat LED displays that are driven by their own video or image servers. Verification that the advertisements run as ordered is facilitated by an information storage module or, more preferably, by a digital camera or series of digital cameras. A traffic counter may be used to determine the traffic that passed by the display while the advertisement was running. Bills and reports containing market and demographic analysis are generated and sent to the customer.

In another implementation of the invention, the operators of digital movie theaters have ongoing, continuous access to tens of thousands of movies that can be ordered in digital form for display on selected "screens" at their theaters at selected times. The movie theater operator is a customer of a system that permits the customer to review movies that are available in digital form and thereafter schedule and purchase a movie for display on the digital movie screens located at the customer's movie theater. The movies may be transmitted by the system to the movie theater operators by a number of transmission modes, most preferably a satellite uplink/downlink system that transmits the movies in non-real time (allowing faster transmission speeds) in encoded digital format, with a decoder at the movie theater to protect against piracy. The system may include means for generating bills to the customers and forwarding the bills for debit payment. The system may also include means for generating royalty payment information for use in paying the content providers for the display of their movies.

BRIEF DESCRIPTION OF THE DRAWINGS

Some of the features of the invention having been stated, other features will appear as the description proceeds, when taken in connection with the accompanying drawings, in which.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
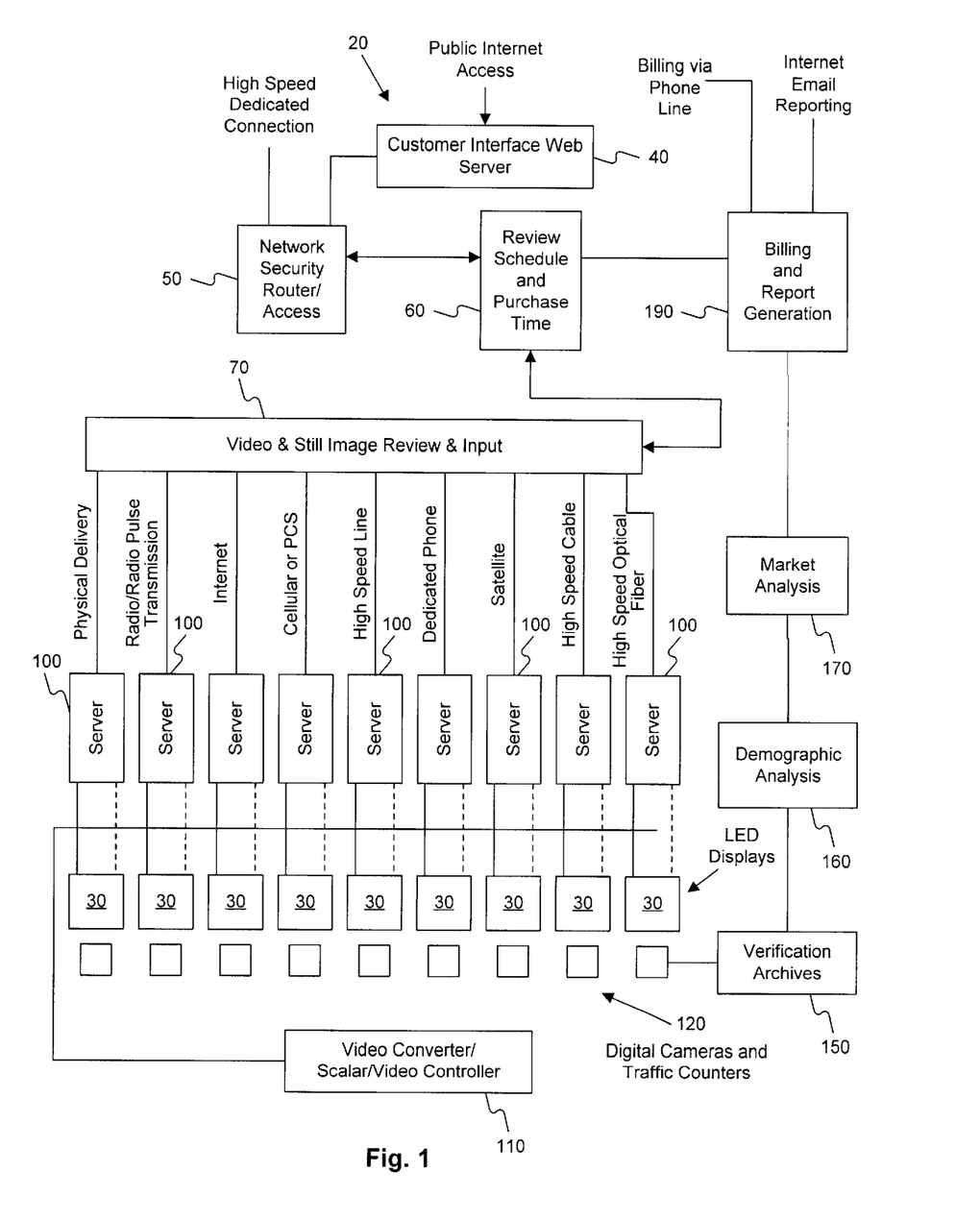
FIG. 1 is a block diagram showing the principal components of a system constructed in accordance with the present invention for advertising purposes.

The Invention Applied to the Display of Commercial Advertising and Other Content Referring to the drawings, and particularly to FIG. 1, there is shown a block diagram of a system 20 for direct placement of commercial advertisements, public service announcements and other content on electronic displays. System 20 includes a network comprising a plurality of electronic displays 30 that are located in high traffic areas in various geographic locations. The displays may be located in areas of high vehicular traffic, and also at indoor and outdoor locations of high pedestrian traffic, as well as in movie theaters, restaurants, sports arenas, casinos or other suitable locations. Thousands of displays, up to 10,000 or more displays worldwide, may be networked according to the present invention. In preferred embodiments, each display is a large (for example, 23 feet by 33½ feet), high resolution, full color display that provides brilliant light emission from a flat panel screen.

A customer of system 20, for example an in-house or agency representative of a consumer products company, may access a central information processing station of the system via the Internet through a Customer Interface Web Server 40. The customer interface web server has a commerce engine and permits the customer to obtain and enter security code and billing code information into a Network Security Router/Access module 50. Alternatively, high usage customers of the system may utilize a customer interface comprising a high speed dedicated connection to module 50. Following access, the customer reviews options concerning his order by reviewing available advertising time/locations through a Review Schedule and Purchase Time module 60 that permits the customer to see what time is available on any display throughout the world and thereafter schedule and purchase the desired advertising time slot. Next, the customer transmits the advertising content on-line through the Internet, a direct phone line or a high speed connection (for example, ISDN, or other suitable high speed information transfer line) for receipt by the system's Video & Still Image Review and Input module 70. In parallel, the system operator may provide public service announcements and other content to module 70. All content, whether still image or video, is formatted in NTSC, PAL, SECAM, YUV, YC, VGA or other suitable formats. In a preferred embodiment, the format is VGA, while all other formats, including but not limited to NTSC, PAL and SECAM, can be run through the video converter 110.

The video & still image review and input module 70 permits a system security employee to conduct a content review to assure that all content meets the security and appropriateness standards established by the system, prior to the content being read to the server 100 associated with each display 30 where the content being transmitted to the server 100 will be displayed. Preferably, the servers are located at their respective displays and each has a backup. An example of a suitable server is the IBM RISC 6000 server.

The means for transmitting content information to the display locations may take a number of forms, with it being understood that any form, or combination thereof, may be utilized at various locations within the network. As shown in FIG. 1, the means include:

a. High speed cable
b. Satellite
c. Dedicated phone
d. High speed line (e.g., ISDN, ADSL)
e. Cellular, PCS or other data transmission at available frequencies
f. Internet
g. Radio/radio pulse transmission
h. High speed optical fiber
i. Physical delivery of digitally stored information medium.

A video converter/scaler function and a video controller function provided by module 110 may be utilized in connection with those servers 100 and associated displays 30 that require them, according to data transmission and required reformatting practices well known in the art.

Verification that advertisements do, in fact, run at the intended time at the intended displays may be provided by an information storage module (not shown) linked to each display. Another form of verification may be achieved by a Digital Camera and Traffic Count Recorder 120 that continuously records the content appearing at its respective display 30 and digitally transmits video verification information to a Verification Archives module 150. Recorder 120 also provides traffic count information (for example, 225 vehicles passed the display while an advertisement ran) to verification archives module 150.

Information from verification archives module 150 is utilized by a demographic analysis module 160 and a market analysis module 170 to generate information for reports to be sent to customers after their advertisements run. To this end, analysis data from modules 160 and 170 is transmitted to a Billing and Report Generation module 190 where reports are assembled showing, for example, the time of the advertisement, the content of the advertisement, the traffic count and residence/median income information about those who saw the advertisement. A representative, simplified report for an advertisement running on a single display is as follows:

---

Customer: ABC Cola Co.
Ad Content: Ocean Scene with graphics
              (content code 1111)
Location: Atlanta, Georgia, Interstate
           75N, milepost 125 (site code
           XXXX)
Time: 7:30 AM, June 30, 2000
Vehicle Count: 225
Viewer Count: 340
Viewer Demographics:
                    50% Resident Cobb
                    County, GA
                    Median household
                    income: $60,000/yr.
                    30% Resident DeKalb
                    County, GA
                    Median household
                    income: $52,000/yr.
                    20% Median household
                    income $55,000/yr.
Advertising Cost: $X

---

For an advertisement that may have run at multiple displays, for example 100 displays, a representative report may appear as follows:

---

Customer: ABC Cola Co.
Ad Content: Mountain Scene with
              graphics (content code 2222)
Locations: 100 sites (site codes
           YYY . . . ZZZ)
Time: 8:30 AM, July 10, 2000
Total Vehicle Count: 21,500
Total Viewer Count: 37,200
Viewer Demographics: Median household
                    income, $49,500
Advertising Cost: $Y

---

Module 190 also produces bills that may be transmitted by phone lines for a debit payment such as a direct bank draft, or other suitable payment mode.

Figure 2:
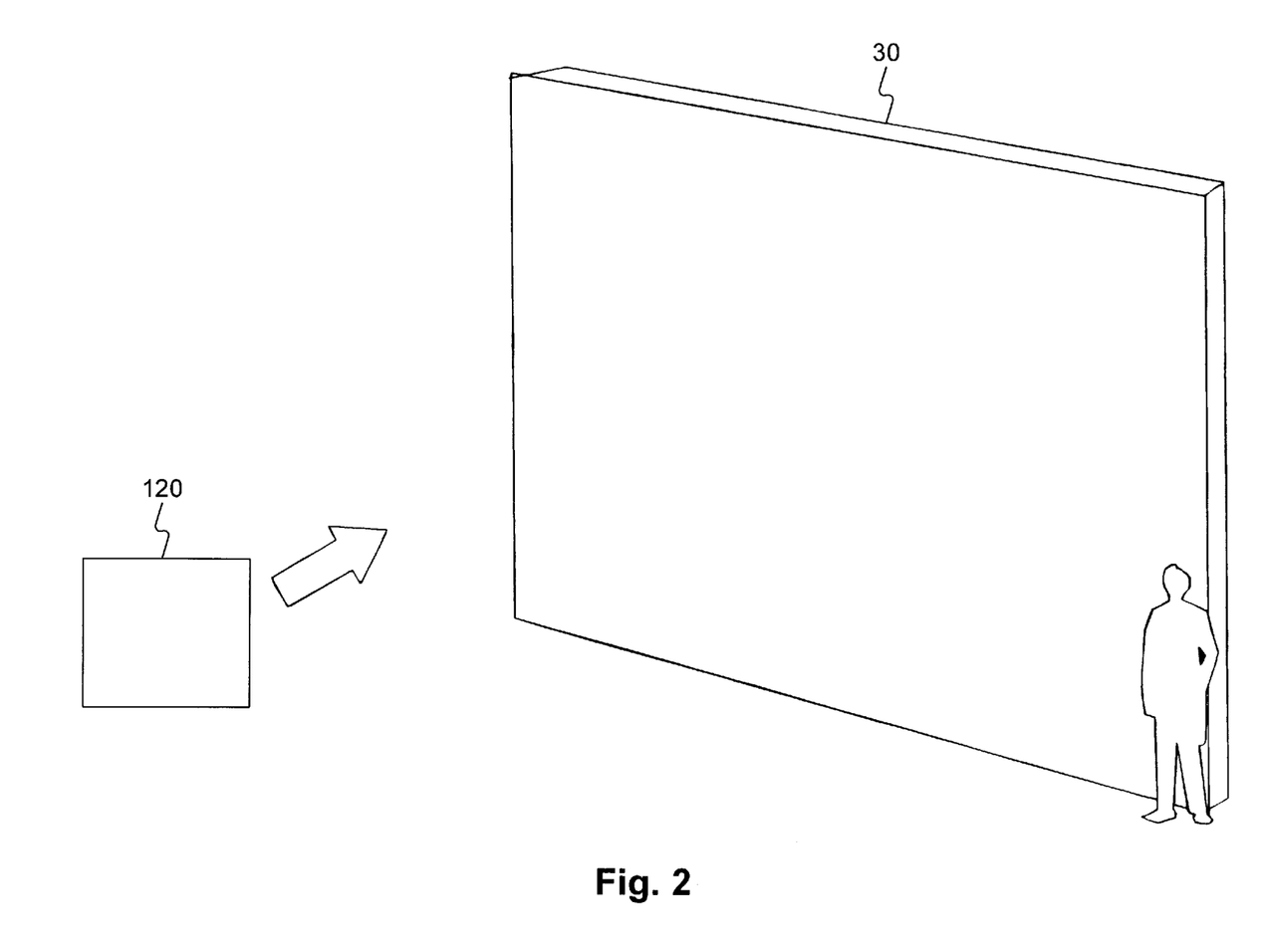
FIG. 2 is a view of one of the electronic displays of the network of FIG. 1.

Referring to FIG. 2, there is shown a pictorial view of one preferred form for the electronic displays 30. In this embodiment, display 30 takes the form of a 23 feet by 33½ feet seamless flat screen display including multiple flat panel display modules. The panels utilize advanced semiconductor technology to provide high resolution, full color images utilizing light emitting diodes (LED's) with very high optical power (1.5–10 milliwatts or greater) that are aligned in an integrated array with each pixel having a red, green and blue LED. It will be appreciated that multiple LED's of a given color may be used at pixels to produce the desired light output; for example, three 1.5 milliwatt blue LED's may be used to produce a 4.5 milliwatt blue light output. Each red, green and blue emitter is accessed with 24 bit resolution, providing 16.7 million colors for every pixel. An overall display of 23 feet by 33½ feet, so constructed, has a high spatial resolution defined by approximately 172,000 pixels at an optical power that is easily viewable in bright sunlight. Suitable display modules for displays 30 are manufactured by Lighthouse Technologies of Hong Kong, China, under Model No. LV50 that utilize, for blue and green, InGaN LED's fabricated on single crystalline $Al_2O_3$ (sapphire) substrates with a suitable buffer layer such as AlN and, for red, superbright AlInGaP LED's fabricated on a suitable substrate such as GaP. These panels have a useful life in excess of 50,000 hours, for example, an expected life under the usage contemplated for network 20 of 150,000 hours and more. In preferred embodiments, the panels are cooled from the back of the displays, preferably via a refrigerant-based air conditioning system (not shown) such as a forced air system or a thermal convection or conduction system. Non refrigerant-based options may be used in locations where they produce satisfactory cooling. The displays preferably have a very wide viewing angle, for example, 160° C.

While the Lighthouse Technologies displays utilize the InGaN on sapphire and AlInGaP on GaP LED's described above (and in certain cases InGaN on SiC), other materials may be used for the LED's as follows:

1. (Blue/green) InGaN on SiC, preferably with a suitable buffer layer such as AlN
2. (Blue/green) InGaN on GaN
3. (Blue/green) InGaN on AlN, preferably with a suitable buffer layer such as AlN.
4. (Blue/green) AlN or AlN-containing compound on AlN, sapphire or SiC.

It will be appreciated that the InGaN on sapphire and the other solid state LED's described above have substrates with high optical transmissivity and produce very high optical power. This is important for a number of reasons, including giving the electronic display designers the ability to create very wide viewing angles up to approximately 160° C., and the resultant increase in visibility of the displays to viewers in oncoming traffic.

In addition to the particular solid state LED's mentioned above, the discrete sources of blue, green and red light at each pixel may take other forms such as composite devices including an ultraviolet LED that is utilized to excite a phosphor that, in turn, produces light of a selected spectrum. The ultraviolet LED may be formed from a GaN or GaN-containing compound on sapphire with or without suitable buffer layer, or a GaN or GaN-containing compound on SiC, preferably with a suitable buffer layer, or an AlN or AlN-containing compound on AlN, sapphire, SiC or GaN, with or without a suitable buffer layer. In one embodiment, ultraviolet LED's are incorporated into three different composite devices, each with a different phosphor for producing blue, green and red, respectively. In another embodiment, a phosphor is selected to produce white light and a desired color is produced by passing the white light through a band pass filter. According to this white-light embodiment, filters of blue, green and red may be used to create discrete composite devices that produce blue, green and red light at each pixel. The use of white light with appropriate band pass filters has the advantage of producing a colored light with an excellent wave length distribution that will not change appreciably over time, a desirable property for color balancing. On the other hand, the use of three different phosphors to directly produce blue, green and red without a filter has the advantage of higher efficiency because light is not filtered out. Both approaches have the advantage of excellent persistence which, as known in the art, is a desirable feature that is especially important in video applications, particularly digital movie theater applications that are discussed in detail below.

It will be appreciated that energy sources other than ultraviolet LED's may be used to excite the phosphors of the composite devices discussed immediately above.

In the case of low ambient light applications, such as digital movie theaters, lower power LED's may be used. Furthermore, higher power LED's may be used to provide a light source for an LCD shutter-type screen as described in U.S. Pat. No. 5,724,062, incorporated herein by reference.

The provision of one or more high resolution, highly aligned digital cameras at each display site, for example the camera or cameras utilized in digital camera and traffic counter 120, or other specifically dedicated cameras, provides a means permitting in situ diagnostics and calibration of the displays. As known in the art, certain digital cameras have a resolution of over 7,000,000 pixels — as compared to approximately 172,000 pixels on the above-described 23×33½ ft. display. Thus, by directing a digital camera at a display, or directing multiple digital cameras at different discrete portions of a display, a correspondence may be attained where a portion of each digital camera's image corresponds to a single pixel in the display. Suitable means for aligning the digital camera with the display is used, for example, optical means such as laser alignment marks. At selected times set aside for diagnostics and calibration, such as a five minute period each night, the entire display may be run red, then green, then blue, followed by white, all at multiple power levels. In order to reduce interference, the LED's may be switched on individually for a short period, for example one millisecond each. In the most basic diagnostic operation carried out when the display is run red/green/blue, the camera (s), mounted at a selected distance from the display such as sixty feet away, are capable of detecting nonfunctioning or excessively degraded LED's for replacement.

Beyond replacing defective LED's, each night the system may automatically re-calibrate all LED's in the display. To this end, the display is run red/green/blue at several iterative power levels (e.g., 20%/40%/60%/80%/100%) and the optical power output of each LED is sensed for each power level, with the goal being to calibrate the system so that each red, green or blue LED has the same optical power output at each power level as do the other LED's of the same color. Calibration preferably is achieved by diode recalibration scaler software (e.g., look up table) that may be associated with a scaler (not shown) that acts independently in conjunction with the video converter/scaler at 110 (FIG. 1). The diode recalibration scaler receives information from the diagnostic equipment indicating the optical power output of each LED at the various power levels and, through an associated automatic calibration LED look-up table, accounts for daily variance in LED output (degradation or increase) by adjusting the power curve by which the LED will be driven the next day. This periodic (e.g. daily) in situ recalibration has the benefit of greatly reducing on site maintenance since LED's that have degraded can be run harder to compensate for the degradation, eliminating the need for frequent replacement.

As an alternative to using digital cameras for the diagnostic and calibration function, in other embodiments miniature photodetector chips, with or without band pass filters, may be located in close proximity to each LED in the display for measuring LED light output during diagnostic/calibration operations.

As another alternative, a programmable chip may be located at each pixel so that each individual chip may be reprogrammed as necessary during each calibration sequence to raise or lower the effective light output of the LED's contained in the pixel.

As an alternative to performing daily in situ calibration by looking at every pixel in sequence and adjusting the scaling value for each pixel, a statistical modeling approach may be utilized. According to this approach, selected LED's or groups of LED's may be run in iterative power cycles in order to optimize the overall screen color through statistical analysis to provide a new scaling value for each LED or group of LED's.

When the diagnostic operation operates with an all white display, the three LED's at each pixel may be evaluated individually and collectively to assure that the pixel is contributing the proper spectrum and amount of white light. Through a diagnostic/calibration software package that interrelates output and peak wave length response for each red/green/blue LED at a pixel to the desired white light response, an iterative calibration may be undertaken at each pixel to adjust the values contained in the diode recalibration scaler software or to reprogram programmable logic chips that determine the drive current for each LED located in a specific pixel.

It will be appreciated that split screen images may be displayed at the displays 30. In the simplest application, a still image advertisement may be one half corporate logo and one half scenery. Beyond this simple application, split screen capability may be used to present a portion of the image as a corporate logo, or the like, and the remainder either real time (or near real time) video or still frame. For example, a previously qualified customer with acceptable internal content review procedures may have direct access to a display or displays for the purpose of displaying a real time (or near real time) sports event, news event, or the like, in conjunction with the customer's corporate logo. This display may be achieved by utilizing high speed servers 100 or by bypassing the servers altogether. High speed still image or video transfer may be facilitated by compression techniques such as JPEG and MPEG II, known in the art.

While advertising scheduling and purchasing may take place as described above where customers directly purchase time from available slots according to a fixed fee schedule, it will be appreciated that alternative modes may be used. For example, an auction system such as introduced by eBay Corporation may be used where all previously purchased slots and all unsold slots are auctioned through a bid process (a "total" auction). Additionally, a limited auction may be utilized where time may be purchased and booked for a set price, but all time not purchased at the set price becomes available through auction at a fixed time before the run time, for example, one month before run time. As another alternative for a portion of the available time slots, a high usage customer may establish a monthly advertising budget with the system operator that authorizes the operator to select the time slots for display of the customer's advertisements at "best available rate" pricing, taking advantage of last minute availability of time slots and other time slot placement techniques that enable the operator to more completely utilize the network. This or similar time slot placement practices when used for a portion of the available time slots may be implemented by a software package that takes into account the needs of both the customer and the system operator.

It will be appreciated that advertising content information may be transmitted to the electronic display locations by physically delivering a suitable information storage device such as CD ROM, zip drive, DVD ROM or DVD RAM. This approach may be utilized to transmit information to displays at any desired location, for example, to remote locations, to movie theaters, etc.

Figure 3:
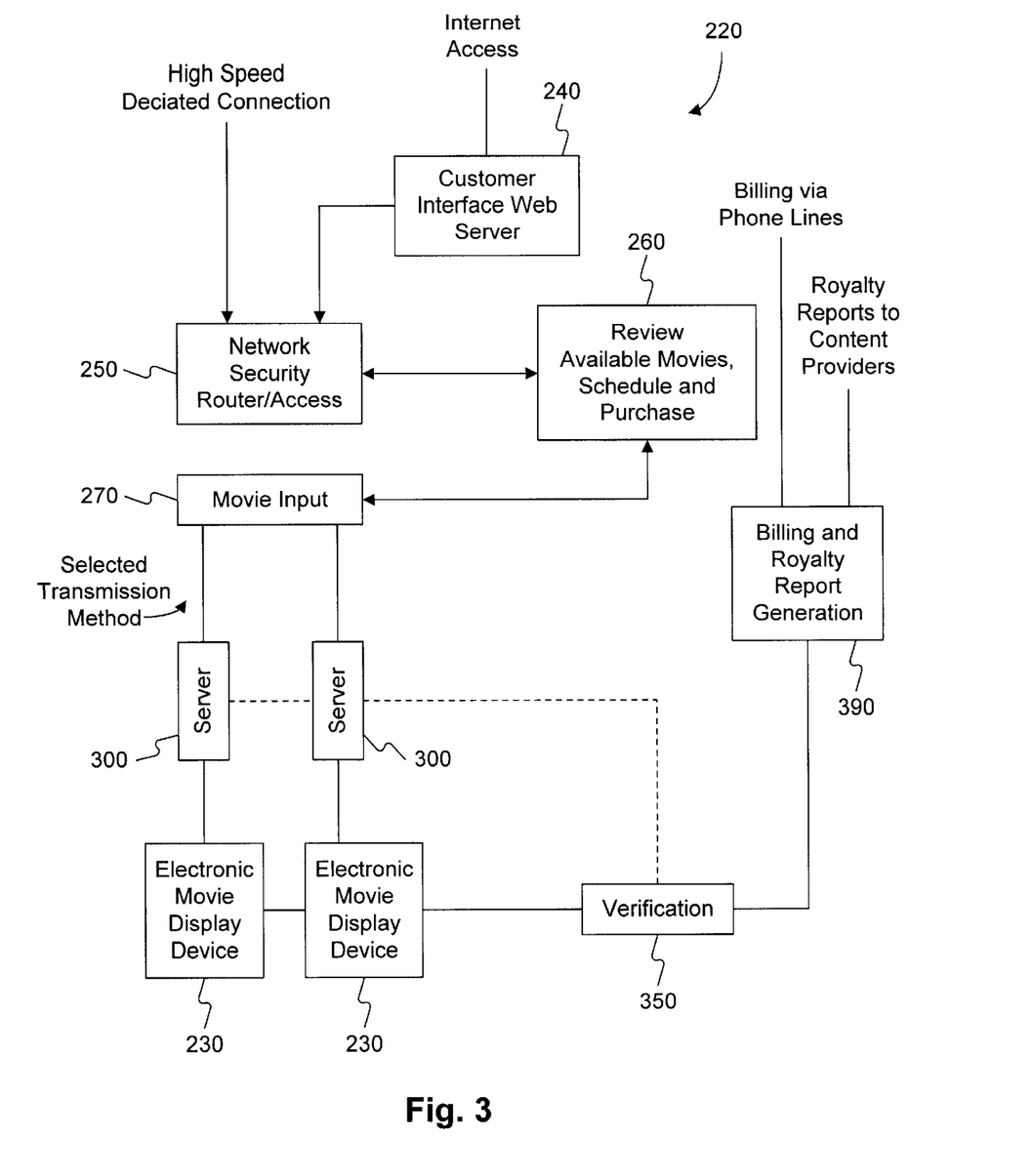
FIG. 3 is a block diagram showing the principal components of a system constructed in accordance with the present invention for the purpose of distributing digital movies to movie theaters.

The Invention Applied to Distribution of Movies in Digital Form to Movie Theaters Referring to FIG. 3, there is shown a block diagram of a system 220 for distribution of movies in digital form to movie theaters. System 220 includes a network connecting a plurality of electronic movie display devices 230 located in movie theaters of customers of system 220. The movie theaters may be "single screen" theaters having only one display device 230, such as small art houses. The theaters may also be smaller theaters with only two or three screens up to large mega-theaters having twenty or more display devices 230. The electronic movie display devices 230 may take several forms, each of which is fully capable of displaying movies to an audience of 50–100 or more movie goers. The various types of display devices 230 will be described in detail below.

A customer of system 220, a responsible party representing the movie theater and referred to herein as a movie theater operator, may access a central information processing station of the system via the Internet through a Customer Interface Web Server 240. The customer interface web server has a commerce engine and permits the customer to obtain and enter security code and billing code information into a Network Security Router/Access module 50. Alternatively, high usage customers of the system may utilize a customer interface comprising a high speed dedicated connection to module 50. Following access, the customer reviews options concerning his order by reviewing the available movies through a Review Available Movies and Purchase module 260 that permits the customer to see what movies are available, and thereafter schedule and purchase a movie for display utilizing one or more of the customer's electronic movie display devices 230.

Following scheduling and purchasing, the customer-ordered movie is transmitted to a server 300 associated with the customer's movie theater. Preferably, the servers are located at their respective displays 230 and each has a backup. An example of a suitable server is the IBM RISC 6000 server.

The means for transmitting digital movie content to the movie theaters may take a number of forms, with it being understood that any form, or combination thereof, may be used at various locations within the network. In one preferred embodiment of the invention as used in association with the distribution of digital movies, a satellite uplink/downlink system is used to transmit high speed, compressed, non-real time data on a plurality of channels. Each movie theater is in communication via a satellite downlink and has a decoder and a computer-based data storage device. As an example, a satellite may dedicate 100 channels to the continuous transmission of movies in non-real time, for example 3×real time transmission rates, so that approximately 4000 movies per day can be transmitted and are available for movie theater reception. The server (storage device) at each movie theater is programmed at the time the theater owner places an order for a movie to receive and store the particular movie when it is transmitted so that it can be available for screening at the theater at the desired time.

In addition to the above described satellite transmission system, other transmission systems (for example, certain ones of the systems discussed in connection with FIG. 1) may be used either with real time or non-real time transmission. Thus, using a proprietary network of the present invention, a movie theater operator can schedule over the Internet which movies he wants to receive to his server(s). Movies will be encoded so that they will play only on a proprietary operating system. The operating system preferably has a modem that may be queried by the system's billing system on a periodic basis to bill the account. By continuously providing significant content through the satellite transmission system, movie producers, or other content owners, always have all of their content available for sale. Because the system will be providing its own receiver, server and proprietary software system that will support the digital projection units, the encoded content transmitted to each theater is protected from privacy.

In addition to the transmission techniques described above, it will be appreciated that the system may operate utilizing a "platter" of CD ROM, DVD RAM, DVD ROM, tapes or the like on site at each server associated with each digital movie display device 230.

As stated above, any suitable type of digital movie display device may be utilized in the movie theaters that are customers of system 220. Examples are as follows:

1. A large, seamless, flat screen LED display having relatively low power LED's suitable for the low ambient light conditions of a movie theater.
2. A high resolution, full color display utilizing high power LED's providing a light source for an LCD shutter-type screen as described in U.S. Pat. No. 5,724,062, incorporated herein by reference.
3. A projection system based on the digital light processing (DLP) technology developed by Texas Instruments. Complete electronic movie display systems utilizing the Texas Instruments DLP technology are sold by various manufacturers, including Runco, for example, Runco product VX7.
4. Reflective LCD technology developed by Hughes/JVC and Reflective Technologies can provide a completely digital, flat panel, full color movie screen.

Figure 4:
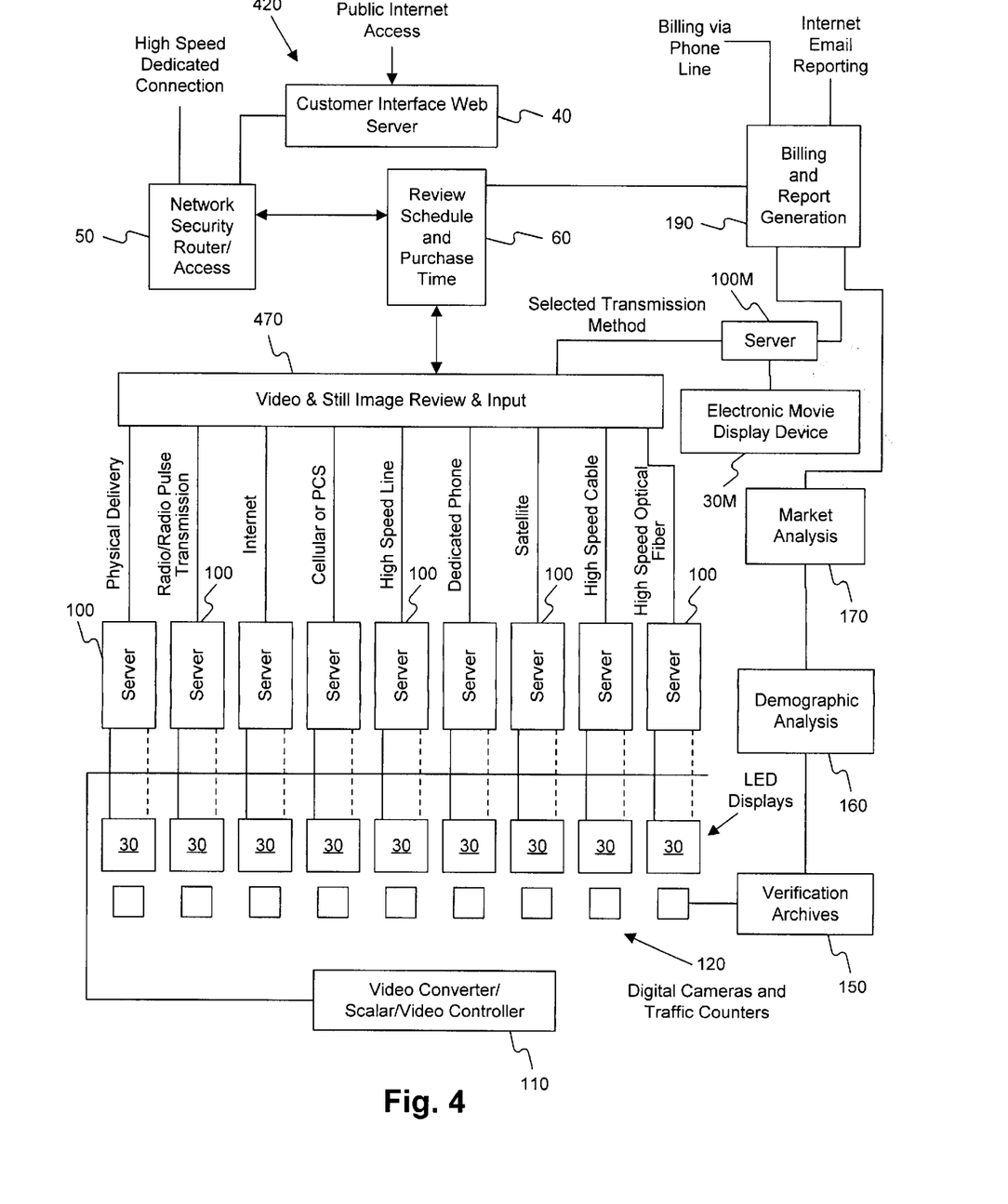
FIG. 4 is a block diagram showing a system that is used for both advertising purposes and for the distribution of digital movies to movie theaters.

FIG. 4 illustrates another system 420 including a network connecting both electronic displays 30 intended for advertising in high traffic areas and electronic movie display devices 230 intended for use as movie "screens" in digital movie theaters. According to this embodiment of the invention, input module 470 transmits advertising content to displays 30 in the manner described above in connection with the embodiment of FIG. 1, while also serving to transmit movies in digital form to movie theaters having a server 100M and electronic movie display devices 30M.

While the present invention has been described with reference to specific embodiments, it will be appreciated that modifications may be made without departing from the true spirit and scope of the invention.

What is claimed is:

1. A system permitting video or still image content to be displayed on selected ones of multiple electronic displays at selected times according to the dictates of system customers, said system comprising:

a network connecting to a plurality of electronic displays;
at least one central information processing station including:
    a customer interface permitting system customers to access the system;
    means permitting system customers to review options concerning their orders;

means permitting a system customer to place an order for a particular video or still image content to be displayed on a particular electronic display of the network;

means for transmitting customer-ordered video or still image content to the customer-selected electronic display location; and means for driving each electronic display to display customer-ordered video or still image content.

2. The system of claim 1 wherein the electronic displays are located in outdoor or indoor high traffic areas primarily for advertising purposes, the video or still image content comprises advertising content and the central information processing station includes means for receiving customer-transmitted video or still image advertising content.

3. The system of claim 1 wherein the electronic displays are electronic movie display devices located in movie theaters, the video or still image content comprises movies in digital form and the system customers comprise movie theater operators.

4. A system for distributing movies owned by content providers and for displaying the movies on a digital display device according to the dictates of digital display device operators who are the customers of the system, said system comprising:

a network connecting to a plurality of electronic movie display devices located in movie theaters;

at least one central information processing station including:

a customer interface permitting system customers to access the system;

means permitting a system customer to review movies that are available in digital form to the customer;

means permitting a system customer to schedule and purchase a movie for display on a particular electronic movie display device located at the customer's movie theater at a scheduled time; and means for transmitting a customer-ordered movie in digital form to the customer's digital display device for display at said scheduled time.

5. The system of claim 4 wherein the electronic movie display devices are selected from the group consisting of LED displays, LCD shutter-type screens, digital light processing systems and reflective LCD displays.

6. The system of claim 4 including means for generating bills to customers.

7. The system of claim 4 including means for generating royalty payment information for use in paying the content providers for use of their content.

8. The system of claim 4 wherein the system includes at least one receiver and at least one server for each customer's movie theater location.

9. The system of claim 4 wherein said means for transmitting a customer-ordered movie in digital form to the customer's movie theater includes a satellite downlink at each customer's movie theater location.

10. The system of claim 9 wherein the movies are transmitted in encoded digital form and the satellite downlink includes a decoder protecting against piracy.

11. The system of claim 10 wherein the movies are transmitted in non-real time.

12. The system of claim 4 wherein said central information processing station includes a customer interface web server permitting Internet access to the system.

13. A method for distributing movies owned by content providers and for displaying the movies on a digital display device according to the dictates of digital display device operators who are the customers, said method comprising the steps of:

(a) permitting customers to review movies that are available in digital form to the customers;

(b) permitting a customer to schedule and purchase a movie for display on a particular electronic display device located at the customer's movie theater at a scheduled time; and (c) transmitting a customer-ordered movie in digital form to the customer's digital display device for display at said scheduled time.

14. The method of claim 13, further comprising the step of providing said content provider with Internet access to enable review, scheduling and purchase of available movie content.

15. The method of claim 14, wherein prior to enabling access to said schedule of times and available electronic display locations, the step of providing security code and billing code information for identifying said customer and authorizing access to said system.

16. The method of claim 15, further including the steps of:

verifying that movie content for scheduled for display is displayed at the intended time at the intended display and generating verification information pertaining thereto; and, receiving and storing in a storage device said verification information generated by each said verification means.

17. The method of claim 16, wherein after said verifying, the step of:

generating bills associated with purchased movies; and, transmitting said bills via phone lines to a content provider.

18. The method of claim 16, further including the step of:

generating royalty payment information for use in paying content providers for use of their movie content.

19. The method of claim 14, further including providing dedicated high-speed connection to a security device for enabling high-usage customers to review, schedule and purchase available movie content.

20. The method of claim 14, wherein said transmitting step c) includes the step of: implementing a transmission mechanism selected from the group comprising: high speed cable, a satellite link, a high-speed communications line, the Internet, a high speed optical fiber.

21. The method of claim 14, wherein prior to transmitting step c), the step of digitizing and encoding said movie content, said digital display device including decoder for decoding said movie content and protecting against piracy.

22. The system of claim, 14 wherein the movies are transmitted in non-real time.

* * * * *